US011240400B2

(12) United States Patent
Baba

(10) Patent No.: US 11,240,400 B2
(45) Date of Patent: Feb. 1, 2022

(54) IMAGE READING AND IMAGE FORMING APPARATUS RELATING IMAGE DATA PIECES OF FRONT AND BACK SIDES OF DOCUMENTS BASED ON DIFFERENT SYMBOLS ASSIGNED

(71) Applicant: KYOCERA Document Solutions Inc., Osaka (JP)

(72) Inventor: Masaki Baba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/273,793

(22) PCT Filed: Aug. 2, 2019

(86) PCT No.: PCT/JP2019/030502
§ 371 (c)(1),
(2) Date: Mar. 5, 2021

(87) PCT Pub. No.: WO2020/049923
PCT Pub. Date: Mar. 12, 2020

(65) Prior Publication Data

US 2021/0203806 A1 Jul. 1, 2021

(30) Foreign Application Priority Data

Sep. 6, 2018 (JP) ............................. JP2018-166941

(51) Int. Cl.
*H04N 1/387* (2006.01)
*H04N 1/00* (2006.01)

(52) U.S. Cl.
CPC ......... *H04N 1/3873* (2013.01); *H04N 1/0044* (2013.01); *H04N 1/3877* (2013.01)

(58) Field of Classification Search
CPC .... H04N 1/387; H04N 1/3872; H04N 1/3873; H04N 1/3875; H04N 1/3877;
(Continued)

(56) References Cited

U.S. PATENT DOCUMENTS

2008/0309957 A1* 12/2008 Horiuchi ............. G06K 9/3208
358/1.9

FOREIGN PATENT DOCUMENTS

JP 2006-339770 A 12/2006
JP 2007-017872 A 1/2007
(Continued)

*Primary Examiner* — Scott A Rogers

(74) *Attorney, Agent, or Firm* — Studebaker & Brackett PC

(57) ABSTRACT

An image reading apparatus includes a document table, a first generating section, a first assigning section, a second generating section, a second assigning section, and a relating section. The first generating section generates a plurality of first image data pieces representing respective first side images of a plurality of documents. The first assigning section assigns first symbols to the respective first image data pieces based on a reference position of the document table. The second generating section generates a plurality of second image data pieces representing respective second side images of the plurality of documents. The second assigning section assigns second symbols to the respective second image data pieces based on the reference position. The relating section relates the first image data pieces to the respective second image data pieces based on the first symbols and the second symbols.

7 Claims, 6 Drawing Sheets

(58) Field of Classification Search
CPC ............... H04N 1/3878; H04N 1/0044; H04N 1/00456; H04N 1/00822; H04N 1/2369; H04N 2201/33335
See application file for complete search history.

(56) References Cited

FOREIGN PATENT DOCUMENTS

| | | | | | |
|---|---|---|---|---|---|
| JP | 2009-100211 A | | 5/2009 | | |
| JP | 2019004298 A | * | 1/2019 | ......... | H04N 1/00761 |

* cited by examiner

IMAGE READING AND IMAGE FORMING APPARATUS RELATING IMAGE DATA PIECES OF FRONT AND BACK SIDES OF DOCUMENTS BASED ON DIFFERENT SYMBOLS ASSIGNED

TECHNICAL FIELD

The present invention relates to an image reading apparatus and an image forming apparatus.

BACKGROUND ART

A known image reading apparatus reads a plurality of documents placed on a document table in a batch and generates an image data piece of each of the plurality of documents. Further, a known image reading apparatus reads back sides of a plurality of documents in a batch after reading front sides of the plurality of documents in a batch, and then relates an image data piece of a front side to an image data piece of a back side for each document. Such an image reading apparatus is capable of previewing a front side image and a back side image for each document in a batch.

For example, an image reading apparatus of Patent Literature 1 relates an image data piece of a front side to an image data piece of a back side based on which area each of the documents was placed when the front side thereof was read and which area each of the documents was placed when the back side thereof was read.

CITATION LIST

Patent Literature

[Patent Literature 1]
Japanese Unexamined Patent Application Publication No. 2009-100211

SUMMARY OF INVENTION

Technical Problem

However, as to the image reading apparatus of Patent Literature 1, in a case where an area on which one of the documents was placed when the front side thereof was read differs from an area on which the document was placed when the back side thereof was read, there is a possibility of generating an erroneously related combination of an image data piece of a front side and an image data piece of a back side. That is, there is a possibility of relating a front side and a back side of different documents.

The present invention has been made in view of the above problem, and an object of the present invention is to provide an image reading apparatus and an image forming apparatus capable of reducing the possibility of generating an erroneously related combination of an image data piece of a front side and an image data piece of a back side.

Solution to Problem

An image reading apparatus according to the present invention includes a document table, a first generating section, a first assigning section, a second generating section, a second assigning section, and a relating section. The first generating section generates a plurality of first image data pieces representing respective first side images of a plurality of documents placed on the document table. The first assigning section assigns first symbols which are different from each other to the respective first image data pieces based on a reference position of the document table. The second generating section generates a plurality of second image data pieces representing respective second side images of the plurality of documents placed on the document table. The second assigning section assigns second symbols which are different from each other to the respective second image data pieces based on the reference position. The relating section relates the first image data pieces to the respective second image data pieces based on the first symbols and the second symbols.

An image forming apparatus according to the present invention includes a document table, a first generating section, a first assigning section, a second generating section, a second assigning section, and a relating section. The first generating section generates a plurality of first image data pieces representing respective first side images of a plurality of documents placed on the document table. The first assigning section assigns first symbols which are different from each other to the respective first image data pieces based on a reference position of the document table. The second generating section generates a plurality of second image data pieces representing respective second side images of the plurality of documents placed on the document table. The second assigning section assigns second symbols which are different from each other to the respective second image data pieces based on the reference position. The relating section relates the respective first image data pieces to the respective second image data pieces based on the first symbols and the second symbols.

Advantageous Effects of Invention

The image reading apparatus and the image forming apparatus according to the present invention are capable of reducing the possibility of generating an erroneously related combination of an image data piece of a front side and an image data piece of a back side.

DESCRIPTION OF EMBODIMENTS

Figure 1:
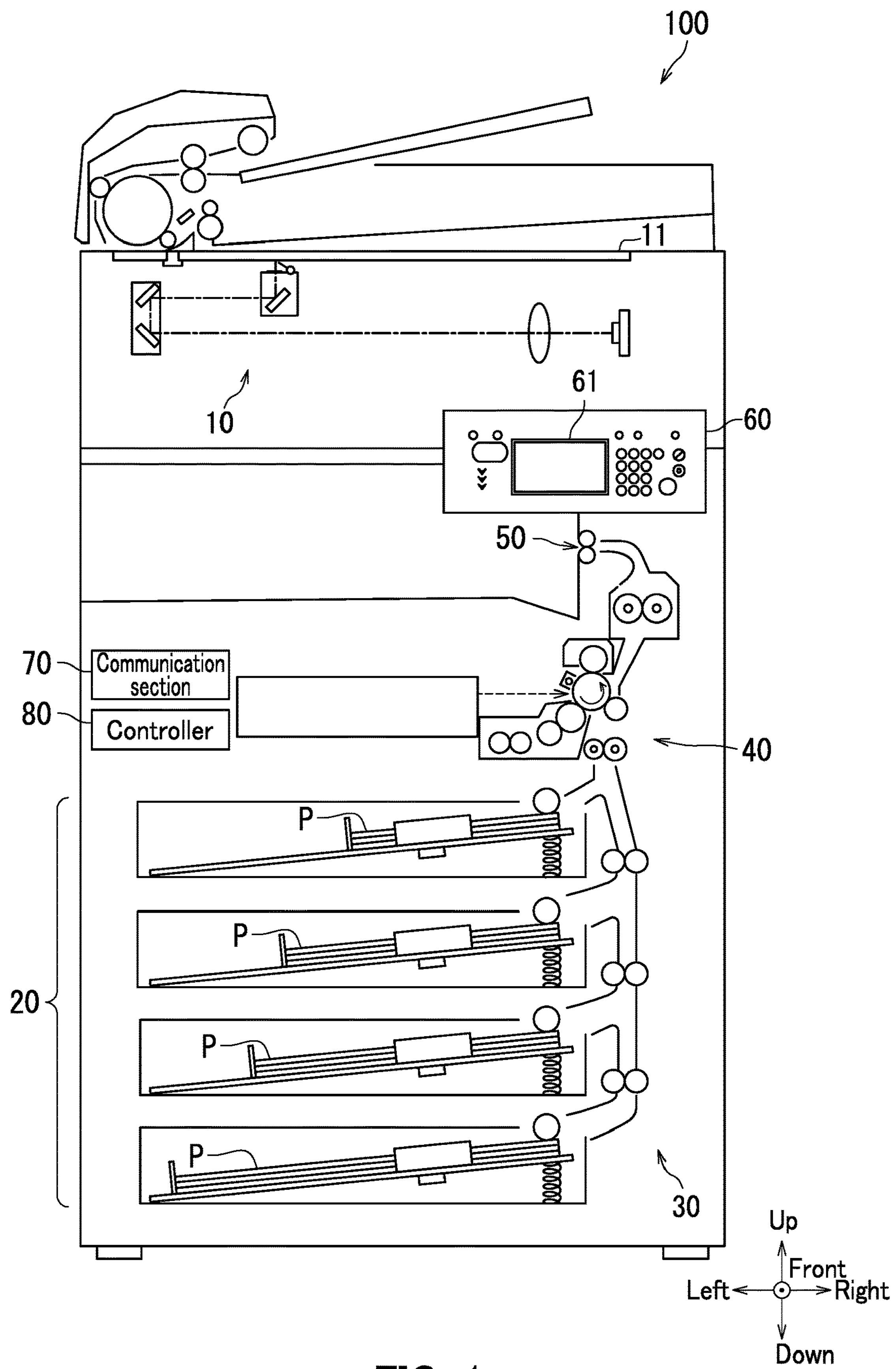
FIG. 1 is a schematic view of a configuration of an image forming apparatus according to an embodiment of the present invention.

The following describes an embodiment of an image reading apparatus and an image forming apparatus according to the present invention with reference to the accompanying drawings. Elements which are the same or equivalent are labeled with the same reference signs in the drawings and description thereof is not repeated.

A configuration of an image forming apparatus 100 according to an embodiment of the present invention will be described with reference to FIG. 1. FIG. 1 is a schematic view of the configuration of the image forming apparatus 100 according to an embodiment of the present invention. In the present embodiment, the image forming apparatus 100 is a multifunction peripheral. The image forming apparatus 100 has a scanner function, a copy function, and a communication function.

As illustrated in FIG. 1, the image forming apparatus 100 includes an image reading section 10, a paper feed cassette 20, a paper conveyance section 30, an image forming section 40, a paper ejection section 50, an input-output section 60, a communication section 70, and a controller 80. Note that the image forming apparatus 100 is an example of an image reading apparatus.

The image reading section 10 includes a document table 11. The document table 11 holds a plurality of documents. The image reading section 10 reads the documents placed on the document table 11, generates image data, and sends the image data to the controller 80. Specifically, the image reading section 10 reads in a batch images of respective first sides (for example, front sides) of the plurality of documents placed on the document table 11 to generate first side data. Further, the image reading section 10 reads in a batch images of respective second sides (for example, back sides) of the plurality of documents placed on the document table 11 to generate second side data. The image reading section 10 sends the first side data and the second side data to the controller 80. Images represented by the first side data will be referred to below as first side images, and images represented by the second side data will be referred to below as second side images.

The paper feed cassette 20 accommodates a recording medium P for printing. When printing is performed, the recording medium P in the paper feed cassette 20 is conveyed by the paper conveyance section 30 so as to pass through the image forming section 40 and be ejected from the paper ejection section 50.

The paper conveyance section 30 conveys the recording medium P through the image forming section 40 to the paper ejection section 50.

The image forming section 40 forms an image on the recording medium P based on image data for printing generated by the controller 80. The recording medium P is paper, for example.

The input-output section 60 detects various touch operations by a user of the image forming apparatus 100. The input-output section 60 has a display section 61 for displaying an image. The display section 61 displays various types of information for presentation to the user. The display section 61 displays for example an integrated image described later with reference to FIG. 4. Specifically, the input-output section 60 detects a touch operation on the integrated image displayed on the display section 61, and notifies the controller 80 of an instruction based on the touch operation. Further, the input-output section 60 displays an image generated by the controller 80 in response to an instruction from the controller 80. The input-output section 60 is for example a liquid crystal display with a touch panel. The input-output section 60 is an example of a detection section.

The communication section 70 is capable of communicating with an electronic device that uses the same communication method (protocol). In the present embodiment, the communication section 70 communicates with an external information processing device (referred to below as an "external device") via a network such as the Internet or a local area network (LAN). The communication section 70 is a communication module, such as a LAN board, for example.

The controller 80 controls operation of each section of the image forming apparatus 100. Further, the controller 80 receives the image data generated by the image reading section 10 and generates image data for printing. Further, the controller 80 receives the image data generated by the image reading section 10 and generates image data for an image to be previewed on the display section 61.

Figure 2:
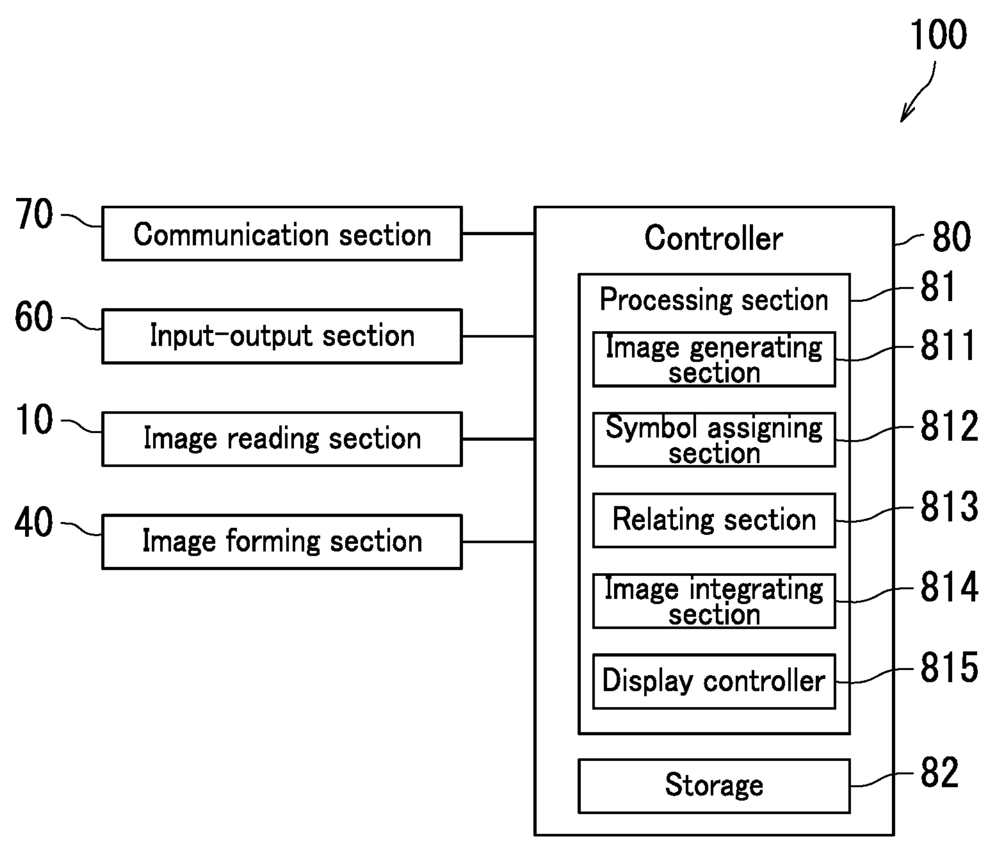
FIG. 2 is a block diagram illustrating a configuration of an image forming apparatus.

The following describes a configuration of the image forming apparatus 100, specifically a detailed configuration of the controller 80 with reference to FIGS. 1 and 2. FIG. 2 is a block diagram illustrating a configuration of the image forming apparatus 100.

As already described with reference to FIG. 1, the image forming apparatus 100 includes an image reading section 10, an image forming section 40, an input-output section 60, a communication section 70, and a controller 80. FIG. 2 illustrates a detailed configuration of the controller 80.

As illustrated in FIG. 2, the controller 80 includes a processing section 81 and storage 82. The processing section 81 is for example a processor. The processor includes for example a central processing unit (CPU). The processing section 81 executes a control program stored in the storage 82, thereby controlling operation of each constituent element of the image forming apparatus 100.

The storage 82 stores various data and a control program. The storage 82 includes for example one or more of read-only memory (ROM), random-access memory (RAM), and a solid-state drive (SSD). The storage 82 may include external memory. The external memory is removable media. The storage 82 may include for example either or both of Universal Serial Bus (USB) memory and a Secure Digital (SD) card as the external memory.

In the present embodiment, as a result of the processing section 81 executing the control program stored in the storage 82, the control program realizes functions of an image generating section 811, a symbol assigning section 812, a relating section 813, an image integrating section 814, and a display controller 815.

The image generating section 811 receives first side data and second side data from the image reading section 10. Further, the image generating section 811 generates a plurality of first image data pieces based on the first side data. Further, the image generating section 811 generates a plurality of second image data pieces based on the second side data. First image data pieces represent first images. Second image data pieces represent second images.

Each of the first image data pieces is image data representing a rectangular image cut out from the first side data. A first image is an image corresponding to a document on the first side. Each of the second image data pieces is image data representing a rectangular image cut out from the second side data. A second image is an image corresponding to a document on the second side.

In the present embodiment, the image generating section 811 generates a plurality of first image data pieces representing respective first side images of a plurality of documents. Further, the image generating section 811 generates a plurality of second image data pieces representing respective second side images of the plurality of documents. Specifically, the image generating section 811 uses a known multi-auto crop function to generate first image data pieces and second image data pieces.

For example, an edge of each rectangular image is detected based on density distribution of the first side image. Further, a plurality of image data pieces are cut out based on the edges of the rectangular images. The cut-out image data pieces are first image data pieces. By a similar method to that for generating first image data pieces, second image data pieces are generated based on the second side image. Note that the image generating section 811 is an example of the first generating section and the second generating section.

In the present embodiment, the image generating section 811 adds position information and size information to respective first image data pieces. The position information represents positions of respective first images on the document table 11. The size information represents sizes of the respective first images. For example, the image generating section 811 calculates center positions of the respective first images based on a reference position S (see FIG. 3A) of the document table 11. Further, the image generating section 811 calculates sizes of the respective first images based on the edges of the first images. Similarly to the first image data pieces, the image generating section 811 adds position information and size information to each of the second image data pieces. The reference position of the document table 11 is for example the left rear end. The document table 11 may have a mark portion indicating the reference position.

The symbol assigning section 812 assigns first symbols which are different from each other to the respective first image data pieces based on the reference position of the document table 11. Further, the symbol assigning section 812 assigns second symbols which are different from each other to the respective second image data pieces based on the reference position of the document table 11. The first symbols are assigned to identify the respective first image data pieces. The second symbols are assigned to identify the respective second image data pieces. The first and second symbols are for example numbers, alphabets, symbols, and special symbols. Note that the symbol assigning section 812 is an example of the first assigning section and the second assigning section.

The relating section 813 relates the first image data pieces to the respective second image data pieces based on the first symbols and the second symbols. The relating of the first image data pieces to the second image data pieces will be described later with reference to FIG. 4. Further, the relating section 813 edits integrated images based on touch operations by the user. The editing of the integrated image will be described later with reference to FIGS. 5A and 5B. Note that the relating section 813 is also an example of an editing section.

The image integrating section 814 generates integrated image data pieces representing integrated images based on the related first image data pieces and the second image data pieces. Details of the integrated images will be described later with reference to FIG. 4. Further, the image integrating section 814 generates list image data representing a list image based on the integrated image data pieces. Details of the list image will be described later with reference to FIGS. 5A and 5B. Note that the image integrating section 814 is an example of a third generating section and a fourth generating section.

The display controller 815 causes the display section 61 to preview the integrated images. Further, the display controller 815 causes the display section 61 to preview the list image.

The following describes a double-sided reading process according to the present embodiment with reference to FIGS. 2 to 6. The double-sided reading process includes a reading process, an assigning process, a relating process, an integrating process, and an editing process. The reading process generates first side data and second side data. Further, the reading process generates first image data pieces and second image data pieces. The assigning process assigns respective first symbols to the first image data pieces and respective second symbols to the second image data pieces. The relating process relates the first image data pieces to the respective second image data pieces based on the first symbols and the second symbols. The integrating process generates integrated images based on the first image data pieces and the second image data pieces related in the relating process. Further, the integrating process generates a list image based on the integrated image data pieces. The editing process edits the integrated images or the list image based on touch operations by the user.

Figure 3A:
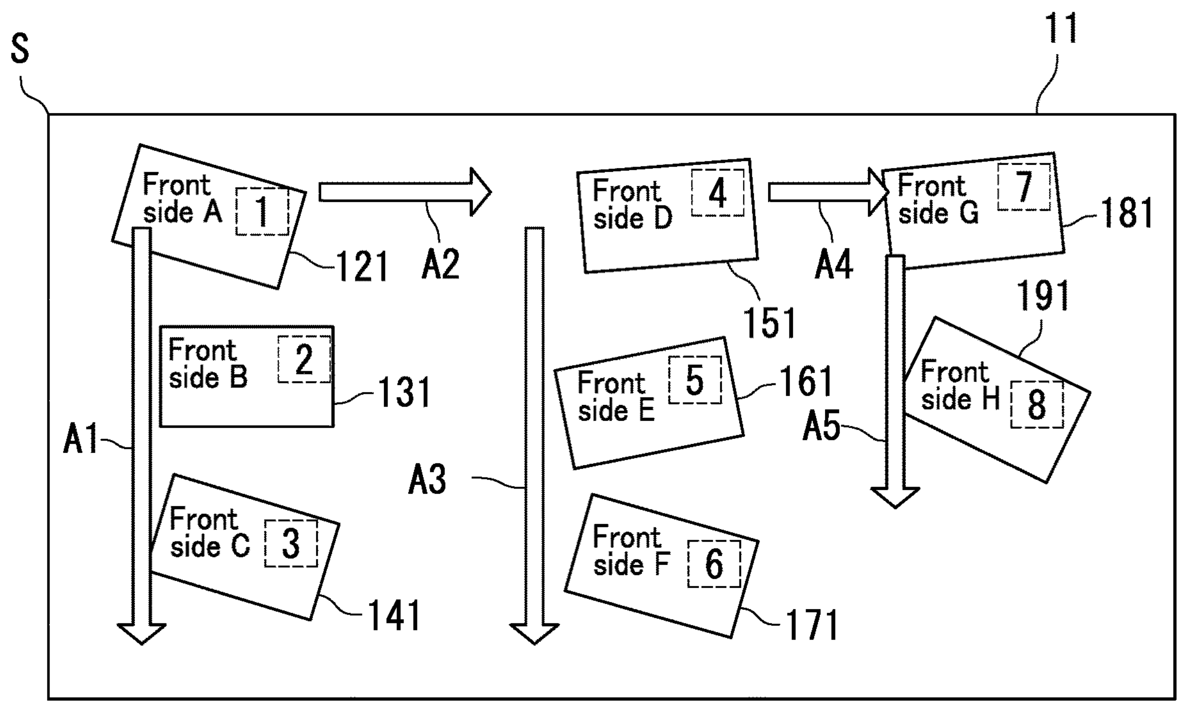
FIG. 3A is a schematic view of a first half process of an assigning process.
Figure 3B:
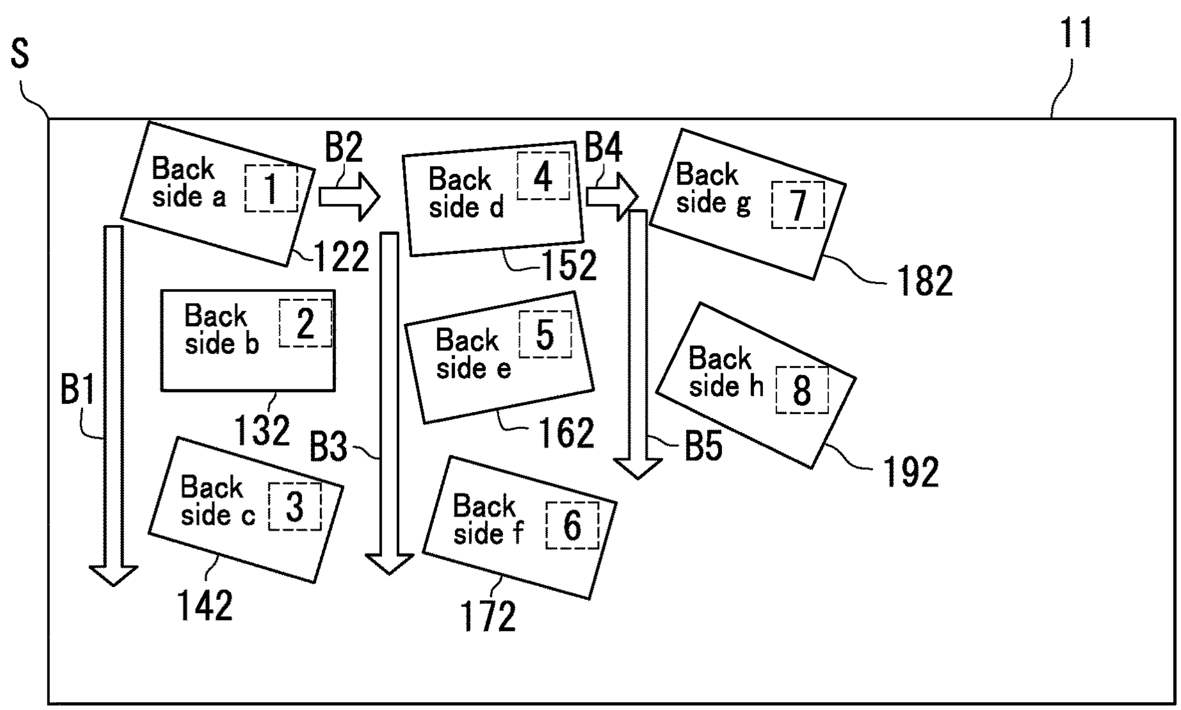
FIG. 3B is a schematic view of a second half process of the assigning process.

The following specifically describes the assigning process with reference to FIGS. 3A and 3B. FIG. 3A is a schematic view of a first half process of an assigning process. That is, FIG. 3A illustrates how first symbols are assigned to first image data pieces.

FIG. 3A illustrates eight documents placed on the document table 11 with their first sides facing down. As illustrated in FIG. 3A, the image generating section 811 generates first image data pieces 121 to 191 representing respective first sides of the eight documents.

As illustrated in FIG. 3A, when the first image data pieces 121 to 191 are generated, the symbol assigning section 812 assigns numbers “1” to “8” as the first symbols to the respective first image data pieces 121 to 191. In the present embodiment, the symbol assigning section 812 assigns the first symbols to the first image data pieces 121 to 191 in the order represented by arrows A1 to A5 in FIG. 3A.

That is, the symbol assigning section 812 first assigns numbers “1” to “3” as the first symbols to the leftmost first image data pieces 121 to 141. Next, the symbol assigning section 812 assigns numbers “4” to “6” as the first symbols to the central first image data pieces 151 to 171. Finally, the symbol assigning section 812 assigns numbers “7” and “8” as the first symbols to the rightmost first image data pieces 181 and 191. As described above, in the present embodiment, the symbol assigning section 812 assigns first symbols to the respective first image data pieces based on the reference position S of the document table 11, positions of the first images, and sizes of the first images.

For example, the symbol assigning section 812 assigns a number “1” to the first image data piece 121 corresponding to the document on the left rear portion among the plurality of first image data pieces, and assigns numbers “2” and “3” to the first image data piece 131 and the first image data piece 141 corresponding to the two documents located in front of the document corresponding to the first image data piece 121. Next, the symbol assigning section 812 assigns a number “4” to the first image data piece 151 corresponding to the document located on the right side of the document corresponding to the first image data piece 121. Thereafter, the symbol assigning section 812 assigns number “5” and “6” to the first image data piece 161 and the first image data piece 171 corresponding to the two documents located in front of the document corresponding to the first image data piece 151.

FIG. 3B is a schematic view of a second half process of the assigning process. That is, FIG. 3B illustrates how second symbols are assigned to second image data pieces.

FIG. 3B illustrates eight documents placed on the document table 11 with their second sides facing down. As illustrated in FIG. 3B, the image generating section 811 generates second image data pieces 122 to 192 representing respective second sides of the eight documents.

As illustrated in FIG. 3B, when the second image data pieces 122 to 192 are generated, the symbol assigning section 812 assigns numbers "1" to "8" as the second symbols to the respective second image data pieces 122 to 192. In the present embodiment, the symbol assigning section 812 assigns the second symbols to the second image data pieces 122 to 192 in the order represented by arrows B1 to B5 in FIG. 3B. That is, the symbol assigning section 812 first assigns numbers "1" to "3" as the second symbols to the leftmost second image data pieces 122 to 142. Next, the symbol assigning section 812 assigns numbers "4" to "6" as the second symbols to the central second image data pieces 152 to 172. Finally, the symbol assigning section 812 assigns numbers "7" and "8" as the second symbols to the rightmost second image data pieces 182 and 192. In the present embodiment as described above, the symbol assigning section 812 assigns second symbols to the respective second image data pieces based on the reference position S of the document table 11, positions of the second images, and sizes of the second images.

Figure 4:
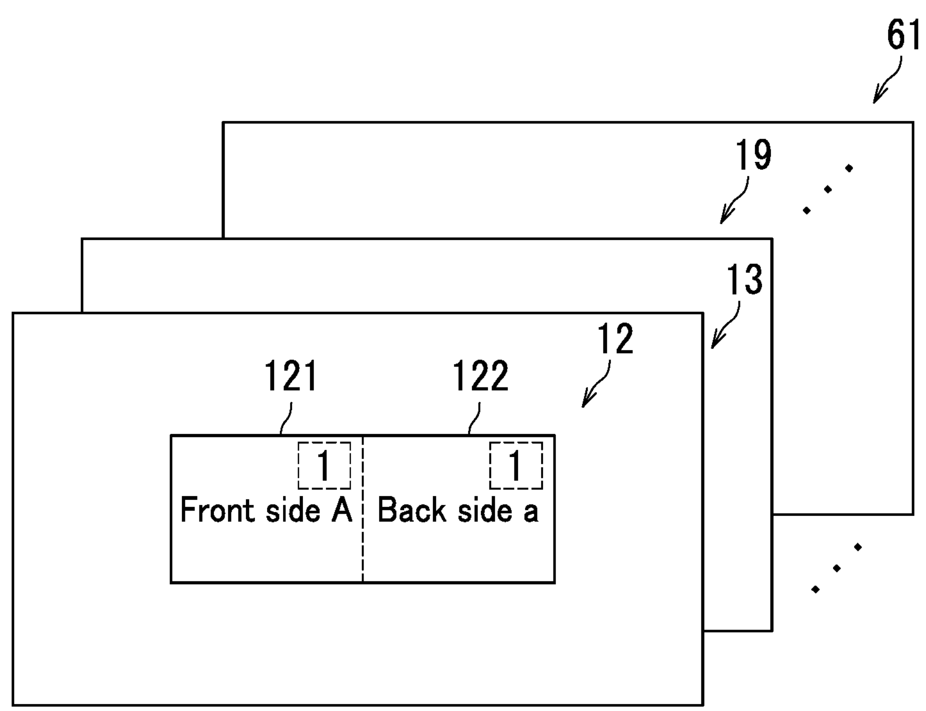
FIG. 4 is a schematic view of integrated images each resulting from integrating two images related in a relating process.

The following describes the relating process and the integrating process with reference to FIG. 4. The relating process is executed by the relating section 813. The integrating process is executed by the image integrating section 814. FIG. 4 is a schematic view of integrated images each resulting from integrating two images related in the relating process. FIG. 4 illustrates eight integrated images 12 to 19. For example, the integrated image 12 includes a first image represented by the first image data piece 121 and a second image represented by the second image data piece 122.

Specifically, the first image and the second image in the integrated image 12 are related to each other through the relating process by the relating section 813. That is, the relating section 813 relates a first image and a second image when it is determined that the number assigned to the first image data piece and the number assigned to the second image data piece match. Here, based on the number "1" assigned to the first image data piece 121 and the number "1" assigned to the second image data piece 122, the relating section 813 relates the first image and the second image.

For example, as illustrated in FIGS. 3A and 3B, the first image data piece 131 to which the number "2" is assigned and the second image data piece 132 to which the number "2" is assigned in the integrated image 13 are related by the relating section 813. Similarly, the first image data piece and the second image data piece in each of the integrated images 14 to 19 are related by the relating section 813.

The integrated images 12 to 19 are displayed on the display section 61 on an integrated image basis, for example. In this case, the user may switch display between the integrated images 12 to 19 using a swipe operation.

Figure 5A:
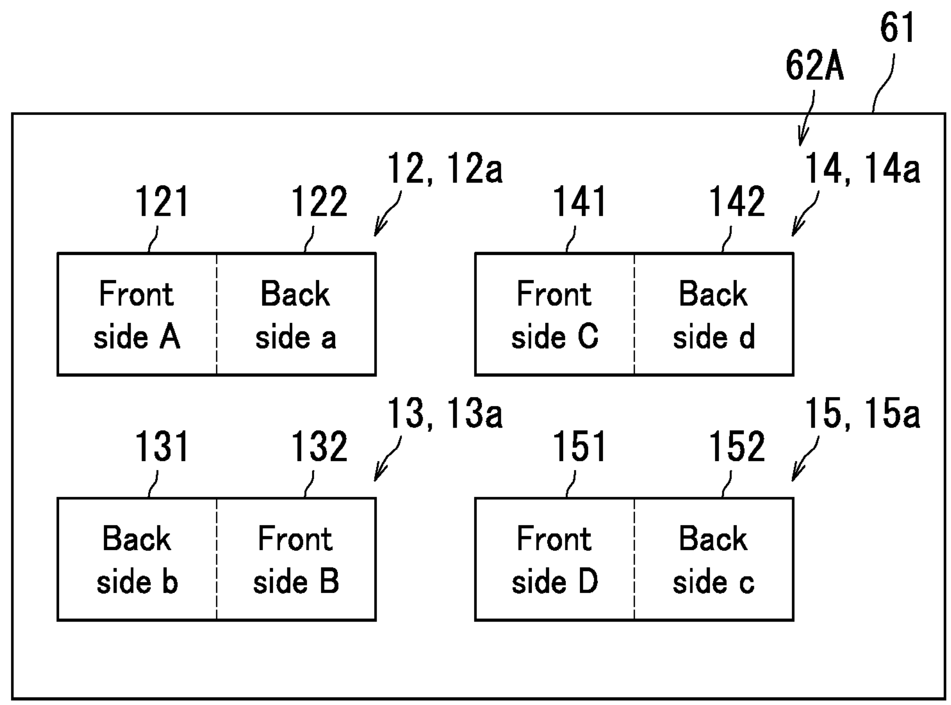
FIG. 5A is a diagram illustrating a list image before an editing process.
Figure 5B:
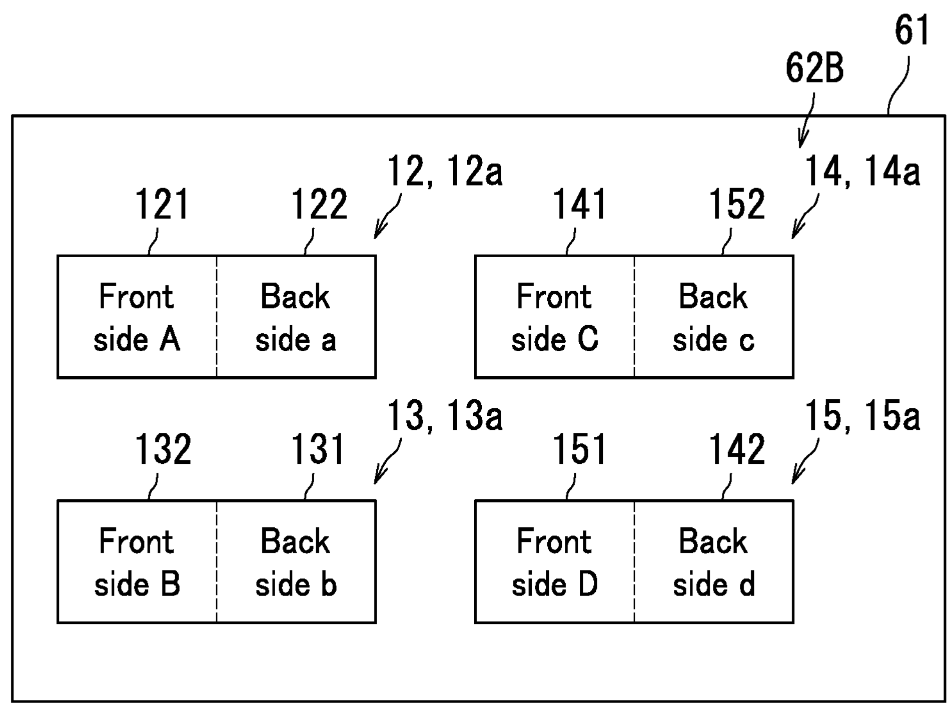
FIG. 5B is a diagram illustrating a list image after the editing process.

The following describes the editing process with reference to FIGS. 5A and 5B. FIG. 5A is a diagram illustrating a list image 62A before the editing process. The list image 62A includes four integrated images. Specifically, the list image 62A includes a reduced image 12*a* representing the integrated image 12, a reduced image 13*a* representing the integrated image 13, a reduced image 14*a* representing the integrated image 14, and a reduced image 15*a* representing the integrated image 15. The reduced image 12*a* represents a first image represented by the first image data piece 121 and a second image represented by the second image data piece 122. Similarly, the reduced image 13*a* represents a first image represented by the first image data piece 131 and a second image represented by the second image data piece 132. The reduced image 14*a* represents a first image represented by the first image data piece 141 and a second image represented by the second image data piece 142. The reduced image 15*a* represents a first image represented by the first image data piece 151 and a second image represented by the second image data piece 152.

In the list image 62A, the first image of the reduced image 13*a* represents "back side b". Also, the second image of the reduced image 13*a* represents "front side B". Thus, in the reduced image 13*a*, the image "front side B" that should be represented by a first image data piece and the image "back side b" that should be represented by a second image data piece are interchanged.

Further, the second image of the reduced image 14*a* in the list image 62A represents "back side d", and the second image of the reduced image 15*a* represents "back side c". Thus, regarding the reduced images 14*a* and 15*a*, the image "back side c" that should be represented by a second image data piece of the reduced image 14*a* and the image "back side d" that should be represented by a second image data piece of the reduced image 15*a* are interchanged. Note that the first image of the reduced image 12*a* in the list image 62A represents "front side A" and the second image represents "back side a", which is correct.

FIG. 5B is a diagram illustrating a list image 62B after an editing process on the list image 62A illustrated in FIG. 5A. As illustrated in FIG. 5B, the first image and the second image of the reduced image 13*a* are interchanged in the list image 62B. Further, the second image of the reduced image 14*a* and the second image of the reduced image 15*a* are interchanged.

The relating section 813 executes an editing process on the list image 62A in FIG. 5A. The relating section 813 executes an editing process on integrated images based on touch operations received from the user. The touch operations received from the user include a first touch operation and a second touch operation. That is, the touch operations include a first touch operation of touching a first candidate image to be interchanged and a second touch operation of touching a second candidate image to be interchanged with the first candidate image. Specifically, in the first touch operation, a first image or a second image included in one of the integrated images is touched. The first touch operation is followed by the second touch operation in which a second image or a first image included in one of the integrated images is touched. The relating section 813 interchanges the first image or the second image touched in the first touch operation with the second image or the first image touched in the second touch operation.

Specific description will be made with reference to FIGS. 5A and 5B. Touch operations are performed on the list image 62A. The first image represented by the first image data piece 131 is touched as a first-time first touch operation, and the second image represented by the second image data piece 132 is touched as a first-time second touch operation. By performing the first-time first touch operation and second touch operation, the first image and the second image in the reduced image 13*a* can be interchanged.

Further, the second image represented by the second image data piece 142 is touched as a second-time first touch operation, and the second image represented by the second image data piece 152 is touched as a second-time second touch operation. By performing the second-time first touch operation and second touch operation, the second image in the reduced image 14*a* and the second image in the reduced image 15*a* can be interchanged. As described above, even if documents are mistaken in reading the first side and in reading the second side, correction can be easily made by such touch operations.

Figure 6:
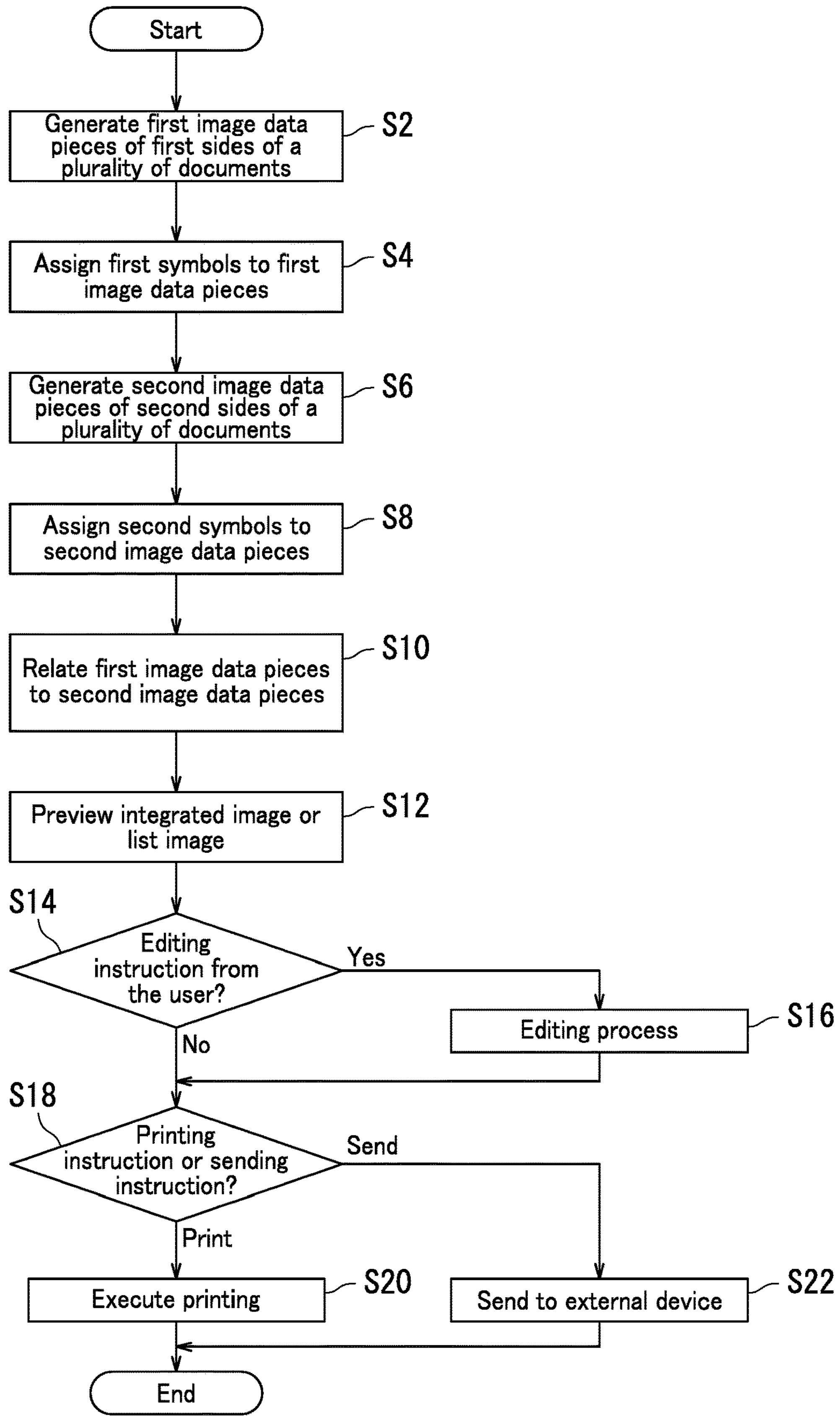
FIG. 6 is a flowchart illustrating a double-sided reading process of the image forming apparatus.

FIG. 6 is a flowchart illustrating a double-sided reading process. The double-sided reading process is executed through Steps S2 to S22.

Step S2: The image generating section 811 generates first image data pieces corresponding to a plurality of documents based on first side data received from the image reading section 10. The process proceeds to Step S4.

Step S4: The symbol assigning section 812 assigns respective first symbols to the first image data pieces. The process proceeds to Step S6.

Step S6: The image generating section 811 generates second image data pieces corresponding to the plurality of documents based on second side data received from the image reading section 10. The process proceeds to Step S8.

Step S8: The symbol assigning section 812 assigns second symbols to the respective second image data pieces. The process proceeds to Step S10.

Step S10: The relating section 813 relates the first image data pieces to the respective second image data pieces based on the first symbols and the second symbols. The process proceeds to Step S12.

Step S12: The image integrating section 814 previews integrated images or a list image based on the first image data pieces and the second image data pieces. The process proceeds to Step S14.

Step S14: When integrated images or a list image is previewed on the display section 61, the relating section 813 determines whether or not there is an edit operation from the user. If the relating section 813 determines that there is an edit operation from the user (Yes in Step S14), the process proceeds to Step S16. If the relating section 813 determines that there is not an edit operation from the user (No in Step S14), the process proceeds to Step S18.

Step S16: The relating section 813 edits integrated image data or list image data based on touch operations by the user. The process proceeds to Step S18.

Step S18: The controller 80 determines whether or not there is a print instruction or a send instruction from the user. If the controller 80 determines that there is a print instruction from the user (Print in Step S18), the process proceeds to Step S20. If the controller 80 determines that there is a send instruction from the user (Send in Step S18), the process proceeds to Step S22.

Step S20: The controller 80 prints integrated images in response to the user's instruction. The double-sided reading process ends.

Step S22: The controller 80 sends integrated image data to an external device in response to the user's instruction. The double-sided reading process ends.

As described above, the image forming apparatus 100 in the present embodiment is capable of reducing the possibility of generating an erroneously related combination of an image data piece of a front side and an image data piece of a back side. Further, even if documents are mistaken in reading the first side and in reading the second side, correction can be easily made by touch operations.

The present embodiment has been described so far with reference to the accompanying drawings (FIGS. 1 to 6). However, the present disclosure is not limited to the above embodiment and may be implemented in various different forms that do not deviate from the essence of the present disclosure (for example, (1) and (2) described below). The drawings schematically illustrate elements of configuration in order to facilitate understanding, and properties such as thickness, length, and number of elements of configuration illustrated in the drawings differ from actual properties thereof in order to facilitate preparation of the drawings. Materials, shapes, dimensions, and the like of the elements of configuration given in the above embodiment are merely examples that do not impose any particular limitations and may be altered in various ways so long as such alterations do not substantially deviate from the effects of the present invention.

(1) In the embodiment of the present invention, a multifunction peripheral has been described as an example of the image forming apparatus 100, but the image forming apparatus 100 is not limited to a multifunction peripheral. The image forming apparatus 100 may be a personal computer including either or both of a scanner and a printer, for example.

2) Further, in the embodiment of the present invention, the image forming apparatus 100 has been described as an example of the image reading apparatus, but the image reading apparatus may be for example a scanner including a touch panel.

Also, the present invention may be implemented as an image reading method including, as steps, the characteristic means of configuration of the image reading apparatus according to the present invention, or may be implemented as a control program including those steps. The program may be distributed through a storage medium such as a CD-ROM or a transmission medium such as a communication network.

INDUSTRIAL APPLICABILITY

The present invention is applicable to fields of an image reading apparatus and an image forming apparatus.

The invention claimed is:

1. An image reading apparatus comprising:

a document table;

a first generating section configured to generate a plurality of first image data pieces representing respective first images of first sides of a plurality of documents placed on the document table;

a first assigning section configured to assign numbers as first symbols which are different from each other to the respective first image data pieces based on a reference position of the document table;

a second generating section configured to generate a plurality of second image data pieces representing respective second images of second sides of the plurality of documents placed on the document table;

a second assigning section configured to assign numbers as second symbols which are different from each other to the respective second image data pieces based on the reference position; and a relating section configured to relate the first image data pieces to the respective second image data pieces based on the first symbols and the second symbols, wherein the first assigning section assigns a number to a first image data piece corresponding to a first reference document closest to the reference position, among the plurality of first image data pieces, assigns continued numbers to first image data pieces corresponding to documents located in a first direction from the first reference document, among the plurality of first image data pieces, in order of distance from the first reference document, assigns a continued number to a first image data piece corresponding to a second reference document located in a second direction from the first reference document, among the plurality of first image data pieces, assigns continued numbers to first image data pieces corresponding to documents located in the first direction from the second reference document, among the plurality of first image data pieces, in order of distance from the second reference document, the second assigning section assigns a number to a second image data piece corresponding to a first reference document closest to the reference position, among the plurality of second image data pieces, assigns continued numbers to second image data pieces corresponding to documents located in the first direction from the first reference document, among the plurality of second image data pieces, in order of distance from the first reference document, assigns a continued number to a second image data piece corresponding to a second reference document located in the second direction from the first reference document, among the plurality of second image data pieces, assigns continued numbers to second image data pieces corresponding to documents located in the first direction from the second reference document, among the plurality of second image data pieces, in order of distance from the second reference document, the reference position is located at a left rear end of the document table, the first direction indicates a direction from rear to front of the document table, and the second direction indicates a direction from left to right of the document table.

2. The image reading apparatus according to claim 1, wherein the document table has a mark portion indicating the reference position.

3. The image reading apparatus according to claim 1, further comprising:

a display section configured to display an image;

a third generating section configured to generate integrated image data pieces representing integrated images of the first images of the first sides and the second images of the second sides based on the related first image data pieces and second image data pieces; and a display controller configured to cause the display section to preview the integrated images based on the integrated image data pieces.

4. The image reading apparatus according to claim 3, further comprising:

a fourth generating section configured to generate list image data based on the integrated image data pieces, wherein the display controller causes the display section to preview a list image based on the list image data, and the list image represents the integrated images.

5. The image reading apparatus according to claim 3, further comprising:

a detection section configured to detect touch operations on the integrated images displayed on the display section; and an editing section configured to edit the integrated images based on the touch operations by a user, wherein the touch operations include a first touch operation of touching a first image or a second image included in one of the integrated images and a second touch operation of touching a second image or a first image included in one of the integrated images, and the editing section interchanges the first image or the second image touched in the first touch operation with the second image or the first image touched in the second touch operation.

6. The image reading apparatus according to claim 1, wherein the first generating section uses a multi-auto crop function to generate the first image data pieces, and the second generating section uses the multi-auto crop function to generate the second image data pieces.

7. An image forming apparatus comprising:

an image reading section configured to read a plurality of documents, and an image forming section configured to form an image on a recording medium, wherein the image reading section includes:

a document table;

a first generating section configured to generate a plurality of first image data pieces representing respective first images of first sides of the plurality of documents placed on the document table;

a first assigning section configured to assign numbers as first symbols which are different from each other to the respective first image data pieces based on a reference position of the document table;

a second generating section configured to generate a plurality of second image data pieces representing respective second images of second sides of the plurality of documents placed on the document table;

a second assigning section configured to assign numbers as second symbols which are different from each other to the respective second image data pieces based on the reference position; and a relating section configured to relate the first image data pieces to the respective second image data pieces based on the first symbols and the second symbols, wherein the first assigning section assigns a number to a first image data piece corresponding to a first reference document closest to the reference position, among the plurality of first image data pieces, assigns continued numbers to first image data pieces corresponding to documents located in a first direction from the first reference document, among the plurality of first image data pieces, in order of distance from the first reference document, assigns a continued number to a first image data piece corresponding to a second reference document located in a second direction from the first reference document, among the plurality of first image data pieces, assigns continued numbers to first image data pieces corresponding to documents located in the first direction from the second reference document, among the plurality of first image data pieces, in order of distance from the second reference document, the second assigning section assigns a number to a second image data piece corresponding to a first reference document closest to the reference position, among the plurality of second image data pieces, assigns continued numbers to second image data pieces corresponding to documents located in the first direction from the first reference document, among the plurality of second image data pieces, in order of distance from the first reference document, assigns a continued number to a second image data piece corresponding to a second reference document located in the second direction from the first reference document, among the plurality of second image data pieces, assigns continued numbers to second image data pieces corresponding to documents located in the first direction from the second reference document, among the plurality of second image data pieces, in order of distance from the second reference document, the reference position is located at a left rear end of the document table, the first direction indicates a direction from rear to front of the document table, and the second direction indicates a direction from left to right of the document table.

* * * * *